(12) United States Patent
Mekechuk et al.

(10) Patent No.: US 9,882,598 B2
(45) Date of Patent: Jan. 30, 2018

(54) COMMUNICATION SYSTEMS ADAPTABLE TO POWER LINE COMMUNICATIONS

(71) Applicant: SunPower Corporation, San Jose, CA (US)

(72) Inventors: Kelly Mekechuk, Austin, TX (US); Jonathan David Williams, Austin, TX (US); Dale Ari Herman, Austin, TX (US)

(73) Assignee: SunPower Corporation, San Jose, CA (US)

( * ) Notice: Subject to any disclaimer, the term of this patent is extended or adjusted under 35 U.S.C. 154(b) by 65 days.

(21) Appl. No.: 14/976,497

(22) Filed: Dec. 21, 2015

(65) Prior Publication Data
US 2017/0085288 A1 Mar. 23, 2017

Related U.S. Application Data

(60) Provisional application No. 62/222,755, filed on Sep. 23, 2015.

(51) Int. Cl.
*H04B 1/40* (2015.01)
*H04B 3/54* (2006.01)
*H04B 1/10* (2006.01)
*H04B 1/04* (2006.01)
*H04B 3/56* (2006.01)

(52) U.S. Cl.
CPC ............ *H04B 1/40* (2013.01); *H04B 1/0475* (2013.01); *H04B 1/10* (2013.01); *H04B 3/54* (2013.01); *H04B 3/56* (2013.01)

(58) Field of Classification Search
CPC .......... H04B 1/40; H04B 1/0475; H04B 1/10; H04B 3/54; H04B 3/56
See application file for complete search history.

(56) References Cited

U.S. PATENT DOCUMENTS

| 5,644,598 A | 7/1997 | Bidese |
| 2008/0013637 A1* | 1/2008 | Kodama ............... H04B 3/54 375/260 |
| 2014/0011462 A1* | 1/2014 | Din ..................... H04B 1/525 455/78 |

(Continued)

FOREIGN PATENT DOCUMENTS

| EP | 0610880 A1 | 8/1994 |
| WO | 2017053420 A1 | 3/2017 |

OTHER PUBLICATIONS

PCTUS2016052875 International Search Report dated Dec. 1, 2016, 3 pages.

*Primary Examiner* — Freshteh N Aghdam
(74) *Attorney, Agent, or Firm* — Boisbrun Hofman, PLLC

(57) ABSTRACT

A communication system and method of operating the same that includes, in one embodiment, a transmit filter including a transmit filter capacitor, and a receive filter coupled to the transmit filter. The communication system also includes a switch, coupled to an auxiliary winding of a transformer and to the transmit filter capacitor, configured to alter an impedance of the transmit filter during a receive mode of operation of the communication system. In another embodiment, a transmitter is configured to receive an input data stream, and produce a control signal for a switch-mode power amplifier employing a predetermined data sequence selected by the input data stream thereto.

18 Claims, 15 Drawing Sheets

(56) References Cited

U.S. PATENT DOCUMENTS

| | | | | |
|---|---|---|---|---|
| 2016/0043767 A1* | 2/2016 | Andersson | ............ | H04B 1/525 |
| | | | | 370/278 |
| 2016/0065352 A1* | 3/2016 | Sjoland | ................. | H04B 1/525 |
| | | | | 370/281 |
| 2016/0072542 A1* | 3/2016 | Din | ..................... | H04B 1/0458 |
| | | | | 370/295 |

\* cited by examiner

US 9,882,598 B2

COMMUNICATION SYSTEMS ADAPTABLE TO POWER LINE COMMUNICATIONS

This application claims the benefit of U.S. Provisional Application Ser. No. 62/222,755 entitled "Adjustable Transmit-Receive Filter and Computationally Efficient Transmitter," filed Sep. 22, 2015, which is incorporated herein by reference.

BACKGROUND

In a half-duplex communication system operable in temporally separated transmit and receive modes of operation, a transmit filter is generally inserted between a power amplifier and a communication medium such as an alternating current ("ac") power line to provide an appropriate level of suppression of out-of-band frequency components. Correspondingly, a receive filter is generally inserted between the communication medium and a receiver input port of the half-duplex communication system to manage out-of-band noise and interference at the input of the receiver. The result of this configuration is that both filters are coupled in parallel to the communication medium. Design trade-offs to meet separate specifications are a result of this coupling, which impacts the physical size of the filtering functions and cost of the end product. Techniques to mitigate design constraints for the parallel filtering functions would provide welcome design relief.

In a typical implementation of a bandpass communication system, a transmitter driver and a transmitter power amplifier operate in the linear mode. A transmitter output of a transceiver is a bandpass modulated signal confined by communication requirements to a limited range of frequencies. Various functional blocks in a transmitter and a receiver (or a transceiver) are formed as different pieces of hardware, often being implemented in separate integrated circuits in combination with a variety of discrete components. The overall design also often includes two separate voltage supply rails, one to power low-voltage circuitry of the communication system and one to power high-voltage circuitry therein.

Transceiver signal processing and control functionalities of the communication system are frequently absorbed into a microprocessor control unit/central processing unit ("MCU/CPU"). To improve power efficiency, a driver and power amplifier are formed of a switching type and a single low-voltage supply is employed to power the same. The use of a switch-mode driver and power amplifier requires a two-level transceiver transmitter output signal within which the desired bandpass signal has been encoded.

There are a variety of different methods that can be utilized to encode the information-bearing bandpass signal into a two-level signal suitable for transmission via a switch-mode power amplifier. One such encoding method employs a discrete-time delta-sigma modulator ("DTDSM") to convert a modulated bandpass signal into a discrete-time two-level (i.e., binary) signal.

In operation, the transmitter takes information data bits (or symbols) to be transmitted as an input, generates the desired passband signal using the modulator, then encodes the passband signal into a two-level discrete signal with the DTDSM. Finally, a two-level signal suitable for input to a switch-mode power amplifier is produced by way of a zero-order hold circuit. In this way, the modulator (e.g., DTDSM) and the zero-order hold circuit are active when the passband signal is being transmitted and necessarily consume extensive computational resources (and electrical energy).

To achieve high signal-to-noise ratio ("SNR") levels and a wide DTDSM passband, the DTDSM executes at a high rate, which increases the design complexity and cost of the DTDSM. Descriptions herein provide approaches that reduce the computational resources by the modulator thereby providing economy in the design of such communication systems.

BRIEF DESCRIPTION OF THE DRAWINGS

The concepts described herein are illustrated by way of example and not by way of limitation in the accompanying FIGUREs. For simplicity and clarity of illustration, elements illustrated in the FIGUREs are not necessarily drawn to scale. Where considered appropriate, reference labels have been repeated among the FIGUREs to indicate corresponding or analogous elements.

Corresponding numerals and symbols in the different FIGUREs generally refer to corresponding parts unless otherwise indicated. The FIGUREs are drawn to clearly illustrate the relevant aspects of the preferred embodiments and are not necessarily drawn to scale.

DETAILED DESCRIPTION OF ILLUSTRATIVE EMBODIMENTS

Figure 1:
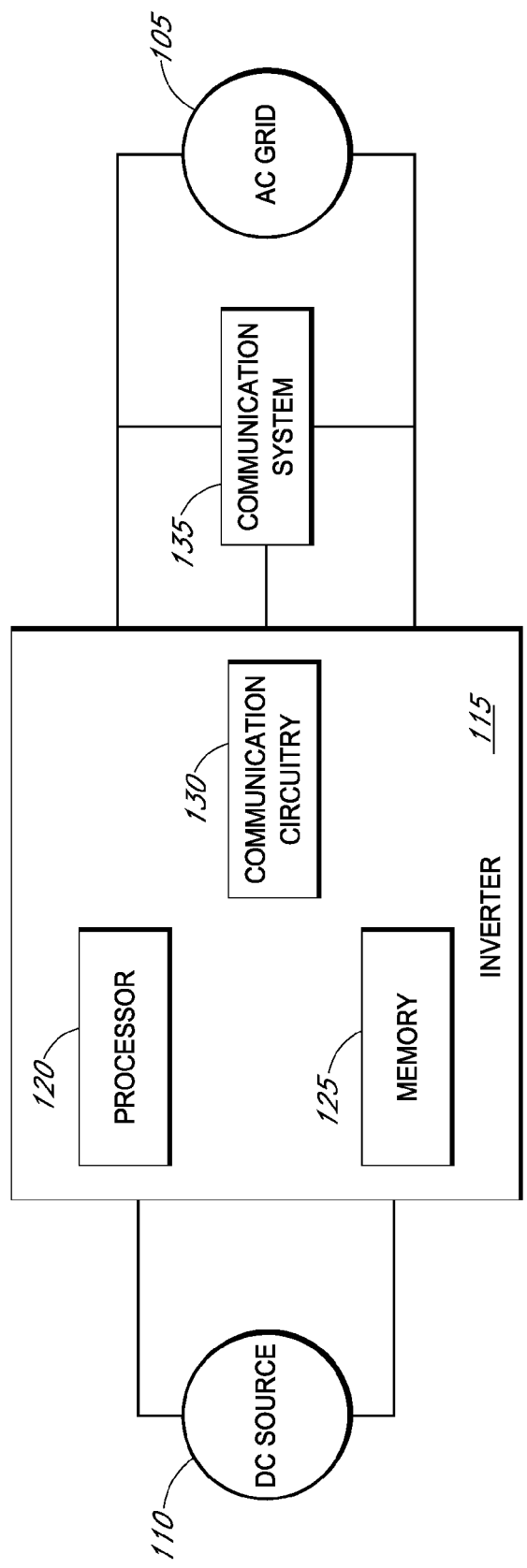
FIGS. 1 to 3 illustrate block diagrams of embodiments of a system, or portions thereof, for supplying alternating current power to an alternating current grid.

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. §112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" state of operation of a PV module does not necessarily imply that this state is the first state in a sequence; instead the term "first" is used to differentiate this state from another state (e.g., a "second" state).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled." The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit." As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative FIGUREs. Additionally, the inclusion of a structural or method feature in a particular FIGURE is not meant to imply that such feature is required in all embodiments and, in some embodiments, may not be included or may be combined with other features.

Embodiments will be described in a specific context, namely, a communication system formed with a switch configured to alter an impedance of a transmit filter during a receive mode of operation, and methods of operating the same. In addition, embodiments will be described in a specific context of an apparatus configured to produce a control signal for a switch-mode power amplifier employing a predetermined data sequence selected by an input data stream. While the principles of the present disclosure will be described in environments of wireless and power-line communication systems, any application that benefits from communication systems and apparatus as disclosed herein is well within the broad scope of the present disclosure.

Figure 2:
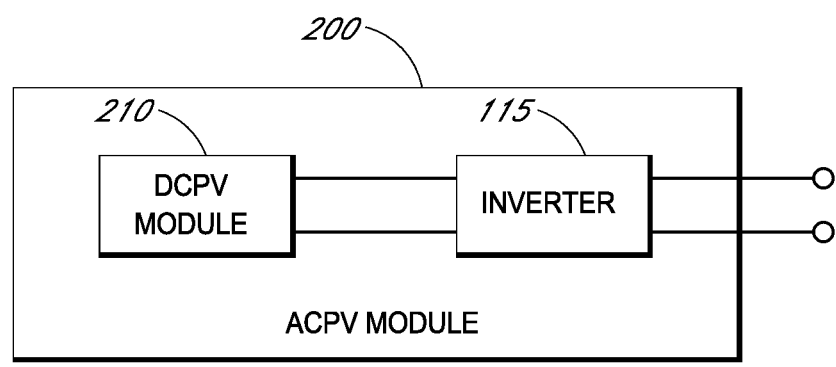
Figure 3:
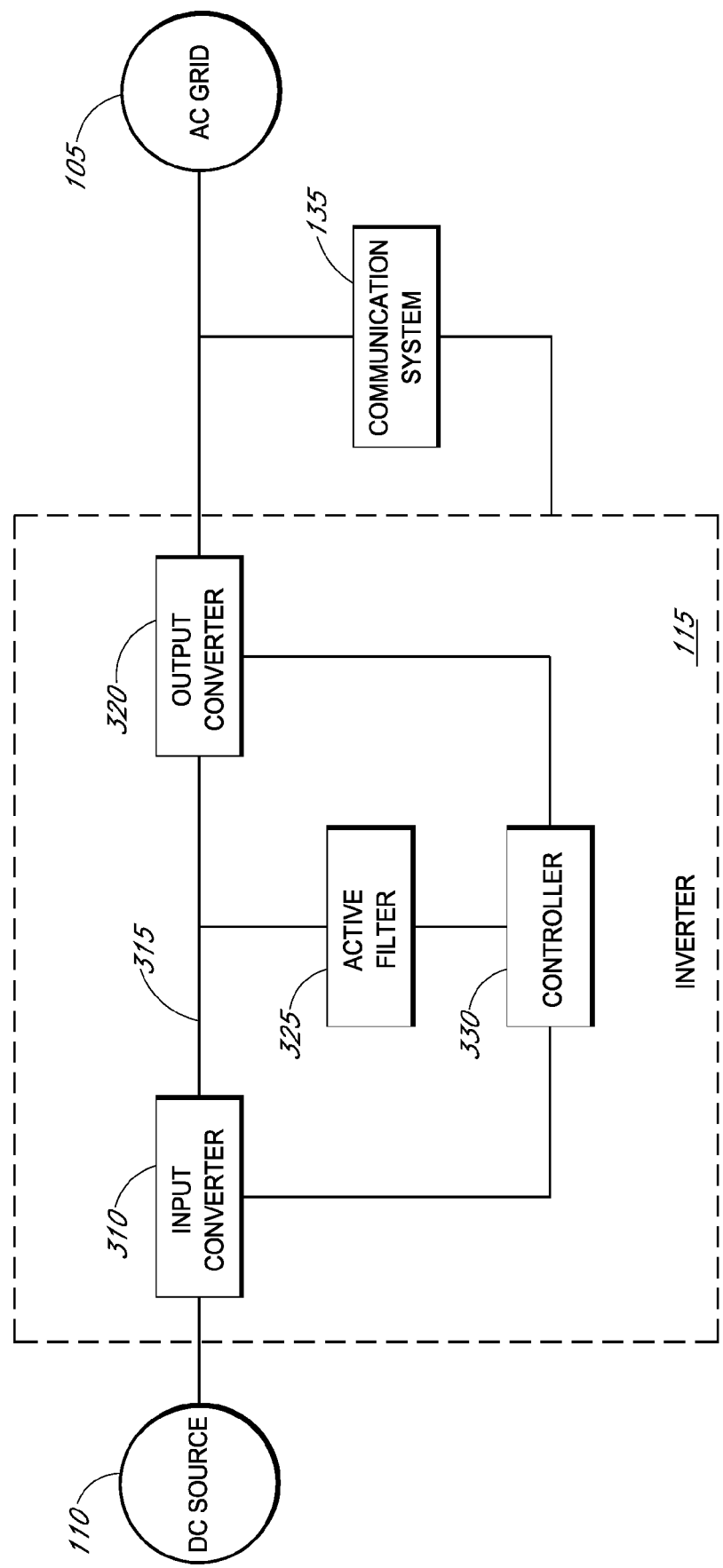

Referring initially to FIGS. 1 to 3, illustrated are block diagrams of embodiments of a system, or portions thereof, for supplying alternating current (hereinafter "ac") power to an ac grid 105 at a grid frequency including a direct current (hereinafter "dc") source 110 and an inverter 115. The dc source 110 may be embodied as any type of dc source configured to generate or produce a dc power, which is supplied to the inverter 115. For example, the dc power may be embodied as a photovoltaic solar cell or array, a fuel cell, a wind turbine configured to generate a dc power (e.g., via a rectifying circuit), a water turbine configured to generate a dc power, or other unipolar power source.

The inverter 115 is electrically connected to the dc source 110 and configured to convert a dc waveform generated by the dc source 110 to an ac waveform suitable for delivery to the ac grid 105 and, in some embodiments, loads coupled to the ac grid 105. The ac grid 105 may be embodied as, for example, a utility power grid that supplies utility ac power to residential and commercial users. Such utility power grids may be characterized as having an essentially sinusoidal bipolar voltage at a fixed grid frequency (e.g., frequency ("f")=ω/2π=50 or 60 hertz ("Hz")).

The inverter 115 includes a plurality of circuits to facilitate the conversion of the dc power to ac power as discussed in more detail below. In some embodiments, the inverter 115 may include a processor 120, memory 125 and communication circuitry 130. The processor 120 may be embodied as any type of processor and associated circuitry configured to perform one or more of the functions described herein. For example, the processor 120 may be embodied as or otherwise include a single or multi-core processor, an application specific integrated circuit, a collection of logic devices, or other circuits. The memory 125 may be embodied as read-only memory devices and/or random access memory devices. For example, the memory 125 may be embodied as or otherwise include dynamic random access memory devices ("DRAM"), synchronous dynamic random access memory devices ("SDRAM"), double-data rate dynamic random access memory devices ("DDR SDRAM"), and/or other volatile or non-volatile memory devices. The memory 125 may have stored therein programs including a plurality of instructions or computer program code for execution by the processor 120 to control particular functions of the inverter 115 as discussed in more detail below. The communication circuitry 130 may include a transceiver and other communication subsystems to communicate with a communication system 135 and/or other remote communication systems, which are coupled to the ac grid 105. Exemplary embodiments of the communication system 135 are set forth below.

The dc source 110 may be embodied as one or more photovoltaic cells. In such embodiments, the dc source 110 and the inverter 115 may be associated with each other to embody an ac photovoltaic ("ACPV") module 200 as illustrated in FIG. 2. The ACPV module 200 includes a dc photovoltaic ("DCPV") module 210, which operates as the dc source 110, electrically coupled to the inverter 115. The DCPV module 210 includes one or more photovoltaic cells and is configured to deliver a dc waveform to the inverter 115 in response to receiving an amount of sunlight. The dc power processed by the ACPV module 200 is a function of environmental variables such as sunlight intensity, sunlight angle of incidence and temperature. In some embodiments, the inverter 115 is positioned in a housing of the ACPV module 200. Alternatively, the inverter 115 may include its own housing secured to the housing of the ACPV module 200. As discussed above, the inverter 115 is configured to convert the dc power received from the DCPV module 210 to ac power suitable for delivery to the ac grid 105 at the grid frequency. It should be appreciated that multiple ACPV modules 200 may be used to form a solar array with each ACPV module 200 having a dedicated inverter 115.

Referring now to FIG. 3, the inverter 115 includes an input converter 310 electrically coupled to a power bus 315, an output converter 320 electrically coupled to the power bus 315, and an active filter 325 electrically coupled to the power bus 315. Additionally, the inverter 115 includes a controller 330 electrically coupled to the input converter 310, the output converter 320, and the active filter 325 to control operations thereof. The power bus 315 may be embodied as a dc bus, an ac bus or a combination thereof. Accordingly, the input converter 310 may be embodied as a dc-to-dc converter or a dc-to-ac converter and the output converter 320 may be embodied as a dc-to-ac converter or an ac-to-ac converter.

The inverter 115 is configured to be electrically coupled to the dc source 110 to receive a dc waveform therefrom. The inverter 115 converts the dc waveform to a bus waveform, which may be a dc waveform or an ac waveform depending on the type of bus. Similarly, the output converter 320 is configured to be electrically coupled to the ac grid 105 and convert the bus waveform (i.e., either a dc waveform or an ac waveform) to the output ac waveform at the grid frequency for delivery to the ac grid 105.

The single-phase power output of the inverter 115 includes an average component and a time-varying component due to variations in the dc source 110 and/or demands of the ac grid 105. The time varying component has a frequency substantially equal to twice the output ac waveform (i.e., the grid frequency). Without filtering, such double-frequency power ripple is supplied by the dc source 110 (i.e., the double frequency ripple power propagates back and forth between the ac grid 105 and the dc source 110). Such demands on the dc source 110 can result in failure or lower performance of the dc source 110 and the inverter 115. As such, the active filter 325 is used to reduce or substantially eliminate the double frequency power ripple occurring on the power bus 315 prior to the dc source 110. To do so, the active filter 325 is configured to supply energy to and absorb energy from the power bus 315 to thereby maintain a substantially constant bus voltage and reduce the amount of time-varying component required of the dc source 110. For more details regarding the aforementioned system, see U.S. Pat. No. 8,279,642 entitled "Apparatus for Converting Direct Current to Alternating Current using an Active Filter to Reduce Double-Frequency Ripple Power of Bus Waveform," to Chapman, et al., which is incorporated herein by reference.

In communication systems such as a half-duplex communication system, it is advantageous to be able to change electrical characteristics of a transmit filter depending upon whether a transceiver is in a transmit or a receive mode of operation. When in a transmit mode of operation, the transmit filter is expected to provide low loss and an appropriate amount of suppression of out-of-band frequency components. Whereas, when in a receive mode of operation, it may be desirable that the impedance of the transmit filter looking into the receiver be as high as possible. As introduced herein, a method of reliably and economically changing the characteristics of a transmit filter uses a switch (e.g., an analog switch) in series with a capacitor that may be coupled to an auxiliary winding (e.g., a secondary winding) of a coupling transformer. Such an arrangement ensures that the received signal is dependent upon the receiver's input impedance and also enables a reduction of the current drive capability of the power amplifiers used in the communication system.

Thus, where the impedance seen by a transmitter is wholly or in part dependent upon the input impedance of the receivers, competing design requirements for the transmitter and receiver subsystems can arise. Specifically, when the transmit filter requirements result in a filter having a relatively low impedance when viewed by other transmitters in the communication system, numerous receivers in parallel, either require that the power amplifier be designed to be able to drive the low net impedance, while still maintaining the appropriate signal level, or will result in system performance degradation as the received signal level will be reduced as the current drive limit of the power amplifier is reached. In addition, the relatively high impedance of a receiver may be partially nullified by the low impedance of the transmit filter that is in parallel with the receiver. In such cases, it would be beneficial to disable or alter the transmit filter when receiving a signal such that the transmit filter presents a higher impedance. Disabling the transmit filter should be done in a reliable and economical manner as it necessarily requires adding circuitry to the design.

Figure 4:
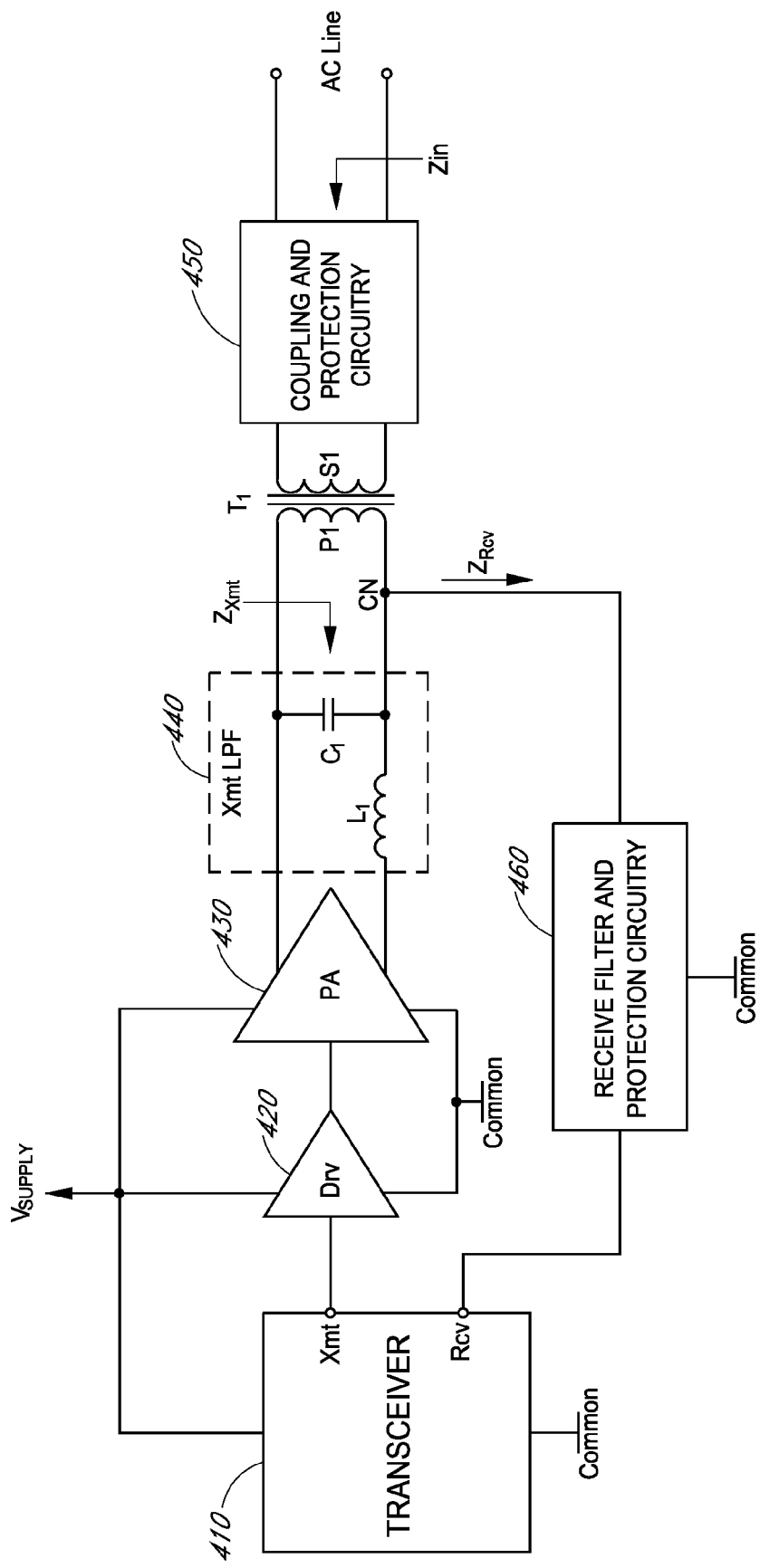
FIGS. 4 to 6 illustrate simplified circuit diagrams of embodiments of communication systems.

Turning now to FIG. 4, illustrated is a simplified circuit diagram of an embodiment of a communication system. The communication system includes a power line communication ("PLC") transceiver 410, an analog subsystem, and a coupling circuit. A transmit analog subsystem is formed with a driver ("Drv") 420, a power amplifier ("PA") 430, a transmit filter (e.g., a transmit low-pass filter ("Xmt LPF") 440) formed with a transmit filter inductor $L_1$ and transmit filter capacitor $C_1$, and coupling and protection circuitry 450. A receive analog subsystem is formed with receive filter and protection circuitry 460, and the coupling and protection circuitry 450 that is shared with the transmit analog subsystem. The receive filter and protection circuitry 460 is coupled to the transmit low-pass filter 440 at a common circuit node CN. A transformer $T_1$ with a primary winding P1 and a secondary winding S1 is employed in the coupling circuitry to isolate the transceiver 410 and analog subsystems from a communication medium such as an ac power line (which feeds, for instance, an ac grid 105 of FIG. 1). It is contemplated that the arrangement illustrated in FIG. 4 can also be applied to other communication systems and is not limited to half-duplex communication over an ac power line.

Since the transceiver 410 operates in a half-duplex manner, the transceiver 410 is either in a transmit mode or a receive mode of operation. When transmitting, the driver 420 and power amplifier 430 are, of course, active, while when receiving the driver 420 and power amplifier 430 are disabled. Since the communication elements of the communication system generally operate on the basis of signal voltages (as opposed to currents), the voltage level of signals at the receiver (or receivers) is generally dependent upon the impedance of the receiver(s) as seen by the transmitter. In general, a higher signal voltage at the receiver is desirable as it results in a higher signal-to-noise ratio ("SNR") given a fixed amount of system noise. Furthermore, a higher received signal level also makes the system less susceptible to interference, which is especially problematic in PLC systems where the communication medium is shared among the devices attached to the ac power line, whether they be motors, lights, televisions, etc. Unfortunately, to overcome noise and interference, the transmitter signal level cannot simply be raised, because there are regulatory limits on the magnitude of a PLC signal that can be injected onto an ac power line. In addition, the desire to keep the cost of the communication components low can result in a limited current-drive capability in the power amplifier 430 such that, at low impedance levels, the power amplifier 430 may not be able to support the current necessary to maintain a certain voltage level.

To ensure the highest possible signal level at the receiver, it is beneficial for the impedance presented to the transmitter by a single receiver (and all devices attached to the communication system) be as high as possible such that the received signal level is enhanced. In this regard, when the transceiver 410 is in a receive mode of operation, an impedance $Z_{in}$ presented to the ac power line is a strong function of the parallel combination of an input impedance $Z_{Xmt}$ to the transmitter, and an input impedance $Z_{Rcv}$ to the receiver. In addition, if there are numerous transceivers connected to the ac power line, the impedance presented to the transmitter will be the parallel combination of the input impedance of all transceivers attached to the ac power line.

In general, the input impedance $Z_{Rcv}$ to the receiver is designed to be relatively high to augment the signal level at the receiver despite the presence of numerous receivers on the ac power line. On the other hand, it is possible for the input impedance $Z_{Xmt}$ to the transmitter to be quite low, especially in the case where an inductor-capacitor ("L-C") low-pass filter forming part of the transmit low-pass filter 440 is part of the transmit analog subsystem. In this case, the value of the input impedance $Z_{Rcv}$ to the receiver, and also the impedance $Z_{in}$ presented to the ac power line is dominated by the impedance of a transmit filter capacitor $C_1$. The use of a low-pass filter in the transmit analog subsystem as shown is advantageous because it permits the transmitter to be used without modification for different carrier frequencies.

The communication system is designed so that the transmitter is disabled when the transceiver 410 is in a receive mode of operation. With the transmitter disabled, there is no need for the presence of the transmit low-pass filter 440 in the communication system. Thus, it can be disabled such that the input impedance $Z_{Xmt}$ to the transmitter is raised, the effective impedance of the receiver can be elevated and, consequently, the received signal level is increased.

Figure 5:
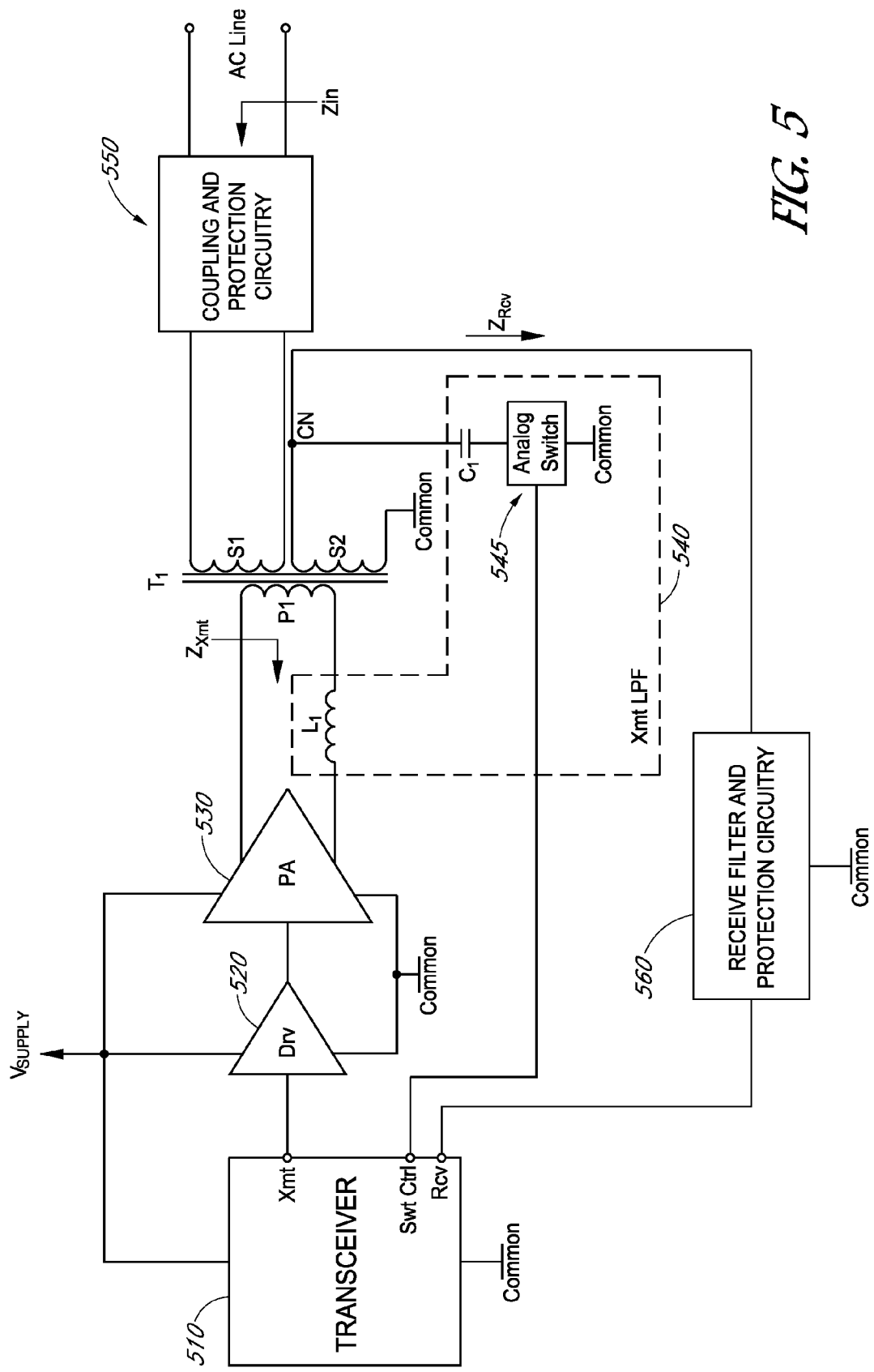

Referring now to FIG. 5, illustrated is a simplified circuit diagram of an embodiment of a communication system. The communication system includes a power line communication ("PLC") transceiver 510, an analog subsystem, and a coupling circuit. A transmit analog subsystem is formed with a driver ("Drv") 520, a power amplifier ("PA") 530, a transmit filter (e.g., a transmit low-pass filter ("Xmt LPF") 540) formed with a transmit filter inductor $L_1$, a transmit filter capacitor $C_1$, and a switch (e.g., an analog switch 545) and coupling and protection circuitry 550. A receive analog subsystem is formed with receive filter and protection circuitry 560, and the coupling and protection circuitry 550 that is shared with the transmit analog subsystem. The receive filter and protection circuitry 560 is coupled to the transmit low-pass filter 540 at a common circuit node CN. A transformer $T_1$ with a primary winding P1, and first and second secondary windings S1, S2 is employed in the coupling circuitry to isolate the transceiver 510 and analog subsystems from a communication medium such as an ac power line (which feeds, for instance, an ac grid 105 of FIG. 1).

The second secondary winding S2 is within a receiver path and the transmit filter capacitor $C_1$ is coupled to the second secondary winding S2 (an auxiliary winding) in parallel with the analog switch 545 that is controlled by the transceiver 510. When the transceiver 510 is in a transmit mode of operation, the analog switch 545 is closed such that the transmit filter capacitor $C_1$, when reflected through the transformer $T_1$ from the second secondary winding S2 to the primary winding P1, appears as part of the transmit low-pass filter 540 with the same attenuation functionality as in Error! Reference source not found. 4. When in a receive mode of operation, the transceiver 510 disables (or opens) the analog switch 545 such that the impedance $Z_{in}$ presented to the ac power line is effectively equal to the input impedance $Z_{Rcv}$ to the receiver since the input impedance $Z_{Xmt}$ to the transmitter is a high impedance, as is the impedance looking into the transmit filter capacitor $C_1$ leg since the analog switch 545 is open and presents a very high impedance.

Figure 6:
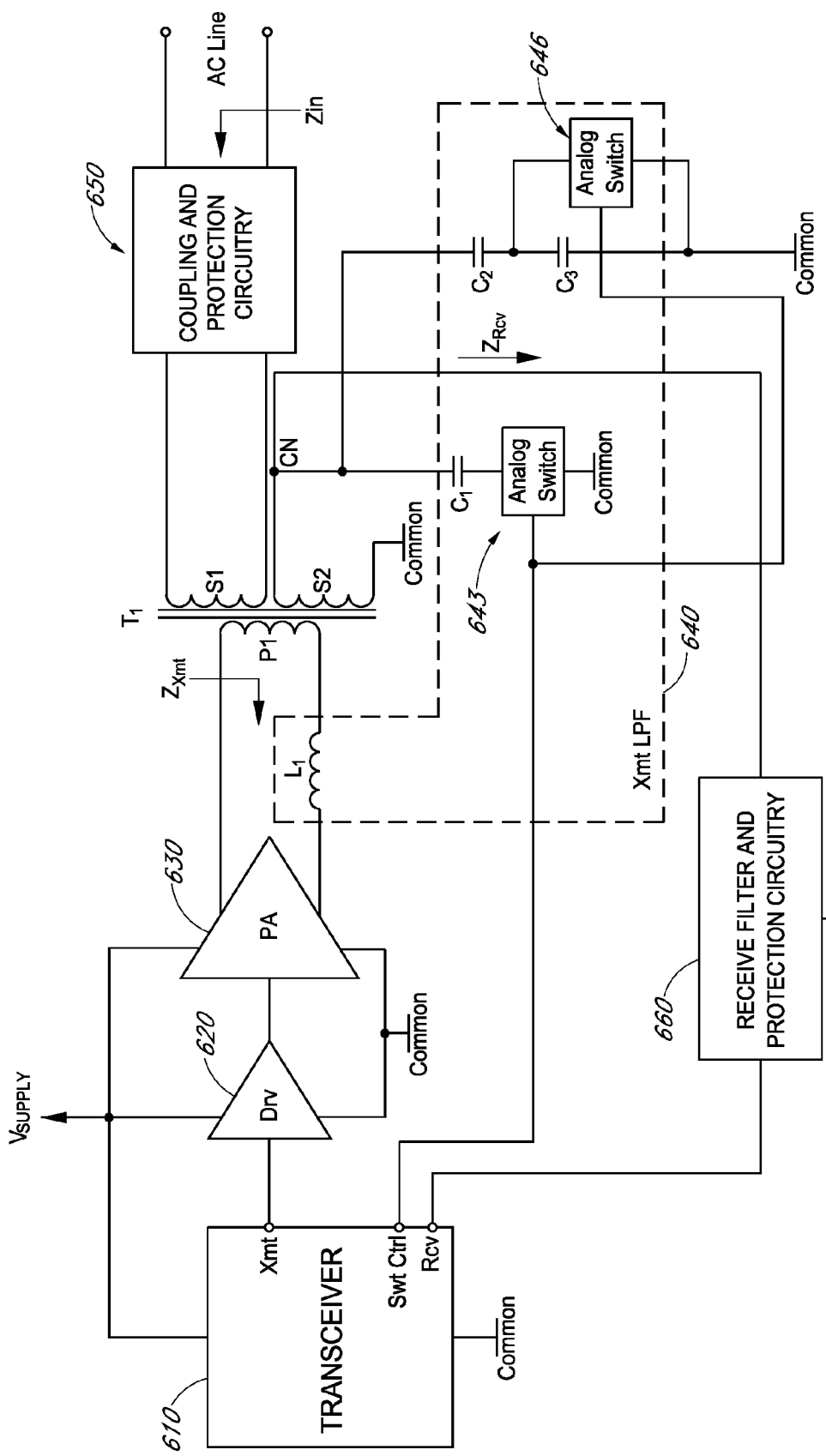

Referring now to FIG. 6, illustrated is a simplified circuit diagram of an embodiment of a communication system. The communication system includes a power line communication ("PLC") transceiver 610, an analog subsystem, and a coupling circuit. A transmit analog subsystem is formed with a driver ("Dry") 620, a power amplifier ("PA") 630, a transmit filter (e.g., a transmit low-pass filter ("Xmt LPF") 640) formed with a transmit filter inductor $L_1$, transmit filter capacitors (e.g., first, second and third transmit filter capacitors $C_1$, $C_2$, $C_3$), and switches (e.g., first and second analog switches 643, 646) and coupling and protection circuitry 650. A receive analog subsystem is formed with receive filter and protection circuitry 660, and the coupling and protection circuitry 650 that is shared with the transmit analog subsystem. The receive filter and protection circuitry 660 is coupled to the transmit low-pass filter 640 at a common circuit node CN. A transformer $T_1$ with a primary winding P1, and first and second secondary windings S1, S2 is employed in the coupling circuitry to isolate the transceiver 610 and analog subsystems from a communication medium such as an ac power line (which feeds, for instance, an ac grid 105 of FIG. 1).

The second secondary winding S2 (an auxiliary winding) is within a receiver path and the first, second and third transmit filter capacitors $C_1$, $C_2$, $C_3$ are coupled to the second secondary winding S2 and coupled to one of the first and second analog switches 643, 646 that are controlled by the transceiver 610. The second analog switch 646 shorts the third filter capacitor $C_3$ to local circuit ground (designated "common") to provide another mechanism to control the impedance presented by the low-pass transmit filter 640 by the transceiver 610. The second analog switch 646 is also configured to open the circuit coupled to the second filter capacitor $C_2$.

Figure 7:
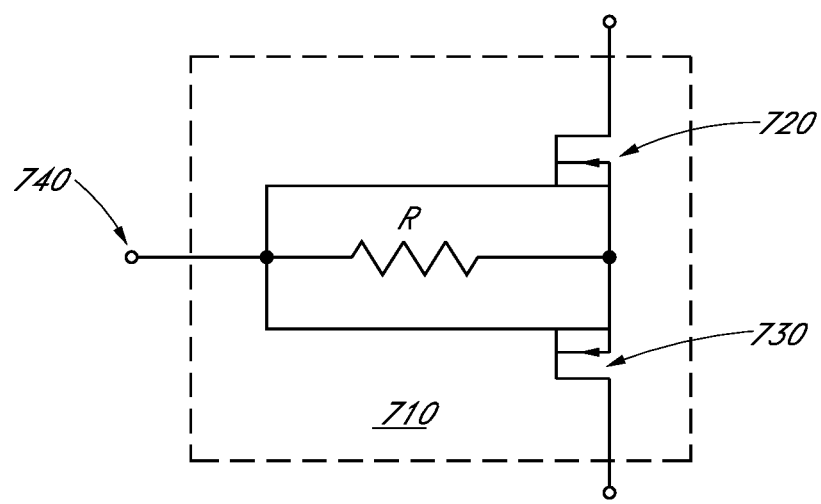
FIG. 7 illustrates a diagram of an embodiment of a switch employable in a communication system.

Turning now to FIG. 7, illustrated is a diagram of an embodiment of a switch 710 employable in a communication system. The switch 710 (such as the analog switches 545, 643, 646 illustrated in FIGS. 5 and 6) is formed with a pair of back-to-back metal-oxide semiconductor field-effect transistors ("MOSFETs") 720, 730. In the example illustrated in FIG. 7, the MOSFETs 720, 730 are n-channel MOSFETs with gates coupled to a control node 740 and sources coupled to the control node 740 through a resistor R.

Figure 8:
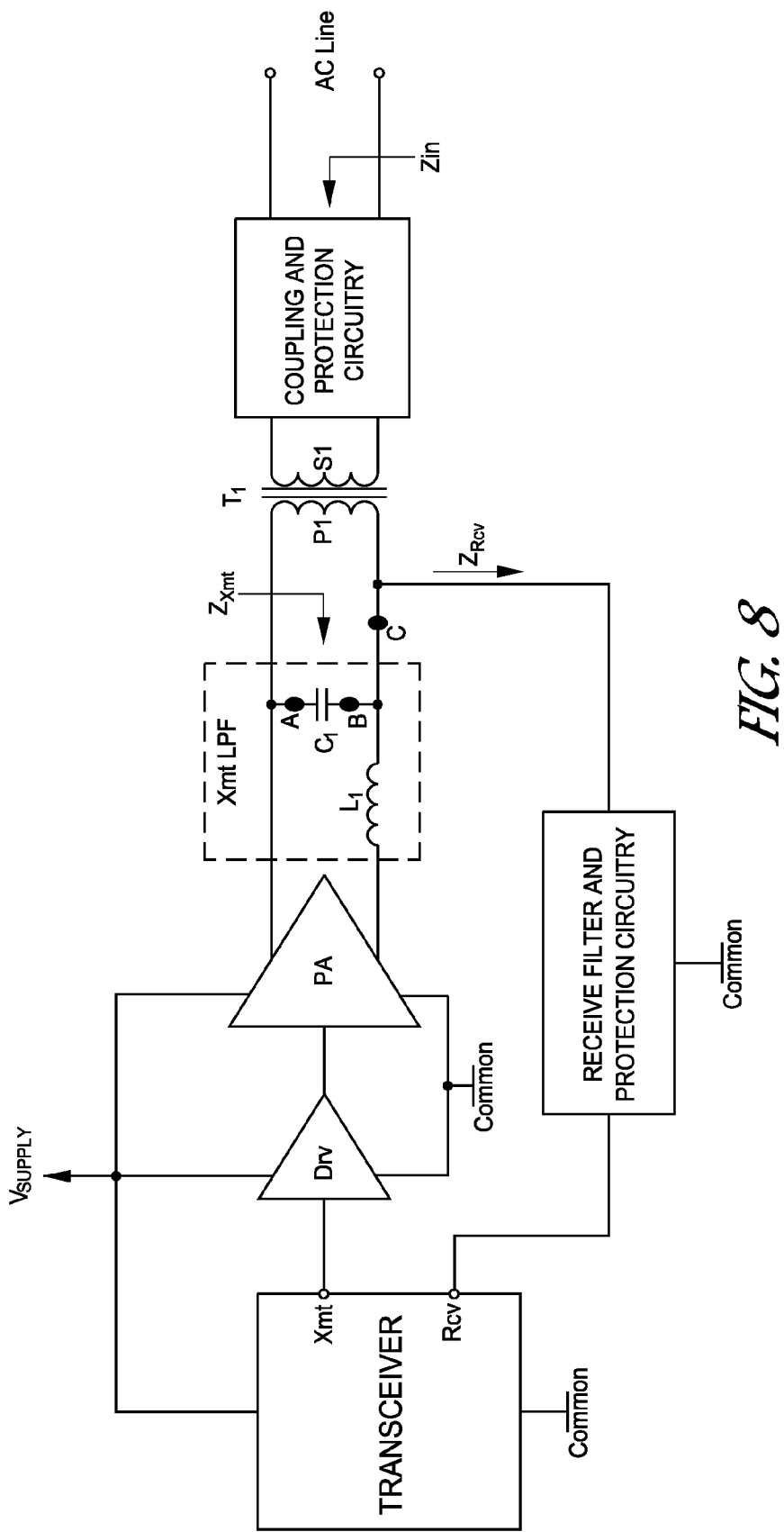
FIG. 8 illustrates a simplified circuit diagram of an embodiment of a communication system.

As illustrated in FIGS. 5 and 6, an auxiliary winding such as the second secondary winding S2 is added to the transformer $T_1$ and the analog switches 545, 643, 646 are coupled to the second secondary winding S2, because it can be controlled by the corresponding transceiver 510, 610 through standard digital logic-level signals. An analog switch can also be put in series at any of the locations labeled A, B, and C as illustrated in the communication system of FIG. 8. Locating an analog switch in series at the points labeled A, B and C may be more difficult in some applications due to the magnitude of the signal swing that may be present at these nodes. For instance, if a power amplifier is formed as an H-bridge, the signal swing at these nodes will normally be higher than the voltage supplied to the transceiver and the voltage used to control the analog switch. Thus, an analog switch formed with back-to-back MOSFETs might not be as easily controlled using standard logic coupled to the transceiver. One alternative to drive MOSFET gates for these locations would be use of an isolating gate-drive transformer for the back-to-back MOSFETs.

Similarly, placing the filter capacitor and the analog switch between the terminals of the second secondary winding may require additional isolation circuitry to be able to control the state of the analog switch from the transceiver (referenced to a common circuit node such as local ground). An added benefit of the second secondary winding is that it provides independent paths through the isolation transformer from the transmitter to the ac power line and from the ac power line to the receiver. This additional freedom allows different transformer turns ratios to be employed in each path, thereby providing an opportunity for additional optimization of the circuitry associated therewith.

An alternative approach to solving the low impedance that the transmit low-pass filter can present to the receiver or to a transmitter of a different transceiver is to enhance the drive capability of the power amplifier. With a higher drive capability, the power amplifier can provide the current level to maintain the voltage level when the impedance presented to the power amplifier is very low. A power amplifier with higher drive capability, however, means the power supply to the power amplifier needs to support this higher current.

Figure 9:
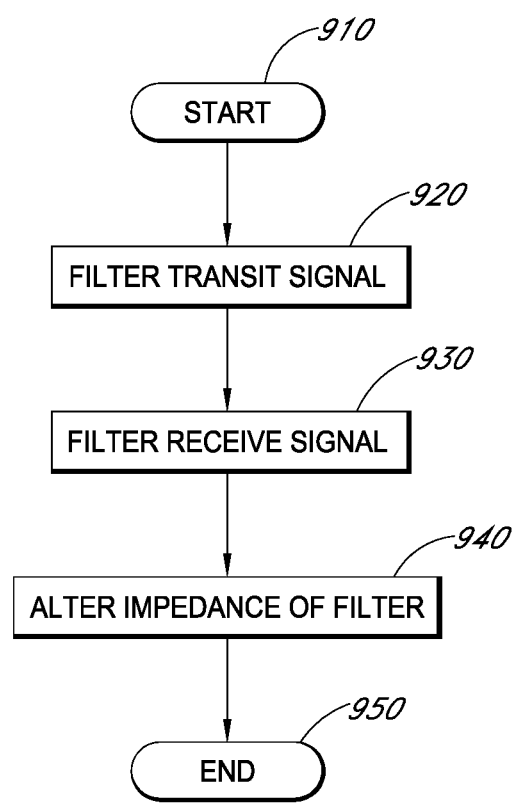
FIG. 9 illustrates a flow diagram of an embodiment of a method of operating a communication system.

Turning now to FIG. 9, illustrated is a flow diagram of an embodiment of a method of operating a communication system couplable to a communication medium such as an alternating current power line. The method begins at a start step or module 910. At a step or module 920, a transmit filter including a transmit filter capacitor filters a signal to be transmitted (a transmit signal) during a transmit mode of operation. The transmit filter may also include a transmit filter inductor coupled between an output of a power amplifier and a primary winding of a transformer of the communication system. The transformer is configured to galvanically isolate the power amplifier from the communication medium.

At a step or module 930, a receive filter coupled to said transmit filter filters a receive signal during a receive mode of operation. The receive filter may be coupled to the transmit filter at a common circuit node of the communication system. During the receive mode of operation, the method alters an impedance of the transmit filter with a switch coupled to an auxiliary winding of a transformer (of the communication system) and to the transmit filter capacitor at a step or module 940. By altering the impedance of the transmit filter, the method alters an impedance between the transmit and receive filters. The switch may be coupled in parallel with the auxiliary winding of the transformer. The auxiliary winding of the transformer may be a secondary winding and the transmit filter capacitor is coupled thereto. The switch may be controlled by a signal from a transceiver of the communication system and may be directed to be open (non-conducting) to alter the impedance of the transmit filter during the receive mode of operation. The switch may be formed, without limitation, with a pair of back-to-back metal-oxide semiconductor field-effect transistors. The method ends at an end step or module 950.

The net result of including the analog switch in a PLC system is communications can be made more reliable since data transmission is less susceptible to degradation due to noise and interference. Thus, a half-duplex communication system and methods of operation thereof with readily attainable and quantifiable advantages has been introduced. In an embodiment, the half-duplex communication system is formed with a transmit filter and a receive filter coupled together at a common circuit node. The transmit filter is coupled to a switch in series with a transmit filter capacitor. During a receive mode of operation of the half-duplex communication system the switch is opened to alter the impedance between the transmit and receive filters. In an embodiment, the half-duplex communication system is formed with a transceiver, and the switch is opened in response to a signal produced by the transceiver.

In an embodiment, a half-duplex communication system includes a transmit filter including a transmit filter capacitor, and a receive filter coupled to the transmit filter at a common circuit node. The half-duplex communication system also includes a switch coupled to the transmit filter capacitor (e.g., in parallel) and the switch (e.g., formed with a pair of back-to-back MOSFETs) is actuated (e.g., opened) during a receive mode of operation of the half-duplex communication system. The switch may be actuated by a signal produced by a transceiver of the half-duplex communication system. The half-duplex communication system may be configured to communicate with a corresponding communication system over an ac power line. The half-duplex communication system may include a power amplifier, and a transformer configured to galvanically isolate the power amplifier from a communication medium (e.g., an ac power line). The transmit filter capacitor may be coupled to a secondary winding of the transformer.

A modulated (information bearing) signal suitable for transmission via a switch mode power amplifier ("PA") is generated by continually selecting from a plurality of precomputed data patterns in accordance with the information symbol sought to be transmitted. The precomputed data patterns are generated numerically using, for instance, a modulator and a discrete-time delta-sigma modulator. The result of generating the signal to be transmitted in this manner is a frequency spectrum at the output of the power amplifier that retains much of the quantization noise shaping properties that would be present if the modulator and discrete-time delta-sigma modulator were run in a real-time manner when transmitting the same information. The benefit of such a scheme is a significant reduction in the computational resources to transmit a signal.

In the vast majority of applications, an overarching requirement is for the design to meet the technical design requirements, and be as low cost as reasonably possible. In an electronics design that has control and bandpass communication functions, it is common for the primary controller, typically a microcontroller unit ("MCU") and/or central processor unit ("CPU"), the transceiver, and the analog transmit and receive circuitry to be some of the more costly items in the product's electronics bill of materials. The cost of the primary controller is generally tied to the amount of functionality that it provides, in terms of the digital computing resources and the analog functions it supports.

A transceiver of a bandpass communication system may not be part of the functionality found within an MCU/CPU, often being a function that is within an integrated circuit ("IC") that is external to the MCU/CPU. The MCU/CPU then controls and interfaces with this external transceiver using baseband digital signaling. The product's cost may be reduced and its reliability enhanced if the functionality of the transceiver is able to be implemented directly in the product's MCU/CPU.

The transceiver of the bandpass communication system normally is coupled to a driver and/or power amplifier to increase the magnitude of the amplitude of the transmitted signal such that it will reach the receiver with the proper signal fidelity. This driver and/or power amplifier is often a linear amplifier that is relatively inefficient (electrically) and employs a voltage supply that is much higher than that used by the MCU/CPU and the transceiver. Although relatively inexpensive linear drivers and power amplifiers can be employed, they still need careful design to ensure they meet the technical design requirements, especially if those requirements include high linearity, a wide range of load impedances, and a wide operating temperature range. If the operating mode of the driver and power amplifier is changed from the traditional linear type to a switched mode type, the product's cost can be reduced and its reliability enhanced while still meeting the technical design requirements. Some of the cost savings associated with using a switch-mode driver and/or power amplifier is achieved by eliminating the need for a voltage supply level that is different than that used by the MCU/CPU. In this way, an incremental cost increase associated with the MCU/CPU supply level due to the need to supply power to the driver and/or power amplifier is outweighed by the cost savings associated with removing a voltage supply level from the product.

When a switch-mode driver and/or power amplifier are employed, one method of encoding the bandpass information bearing signal that is to be transmitted, as described herein, is by using a delta-sigma modulator ("DSM"). A delta-sigma modulator is able to convert a bandpass signal into a two level signal suitable for input to a switch-mode driver and/or power amplifier. In particular, a discrete-time delta-sigma modulator ("DTDSM") can be utilized if the implementation is in the digital domain. The problem with this approach is that the amount of signal processing to achieve the desired performance may exceed that which is economically viable given the cost targets for the product. In addition, the power consumption associated with the signal processing may be excessive. It would be beneficial if a transmitter employed a more computationally efficient scheme to generate a two level signal, but still achieve the benefits associated with a DTDSM encoding scheme. In this way with the signal processing (significantly) reduced, a less expensive MCU/CPU can be utilized, while also reducing the power consumption associated with the signal processing needed to generate the two level signal.

There are a variety of different methods that can be utilized to encode an information-bearing bandpass signal produced in a bandpass communication system into a two-level signal suitable for transmission via a switch-mode power amplifier. One such encoding method employs a DTDSM to convert a modulated bandpass signal into a discrete-time two-level (i.e., binary) signal.

In operation, the transmitter takes information data bits (or symbols/constellation elements) to be transmitted as an input, generates the desired passband signal using the modulator, and then encodes the passband signal into a two-level discrete signal with the DTDSM. Finally, a two-level signal suitable for providing an input to a switch-mode power amplifier is produced by way of a zero-order hold circuit. In this way, the modulators and the zero-order hold circuit are all active when the passband signal is being transmitted and necessarily consume extensive computational resources (and electrical energy).

To achieve high SNR levels and a wide encoding passband, a DTDSM requires a relatively high amount of digital signal processing. The DTDSM executes at a high rate in comparison to the data rate of the input data stream, which increases design complexity and cost of circuit components employed for the digital signal processing of the DTDSM. Processes introduced herein reduce the computational resources needed by the modulator and the DTDSM, thereby providing economy in the design of such communication systems.

Figure 10:
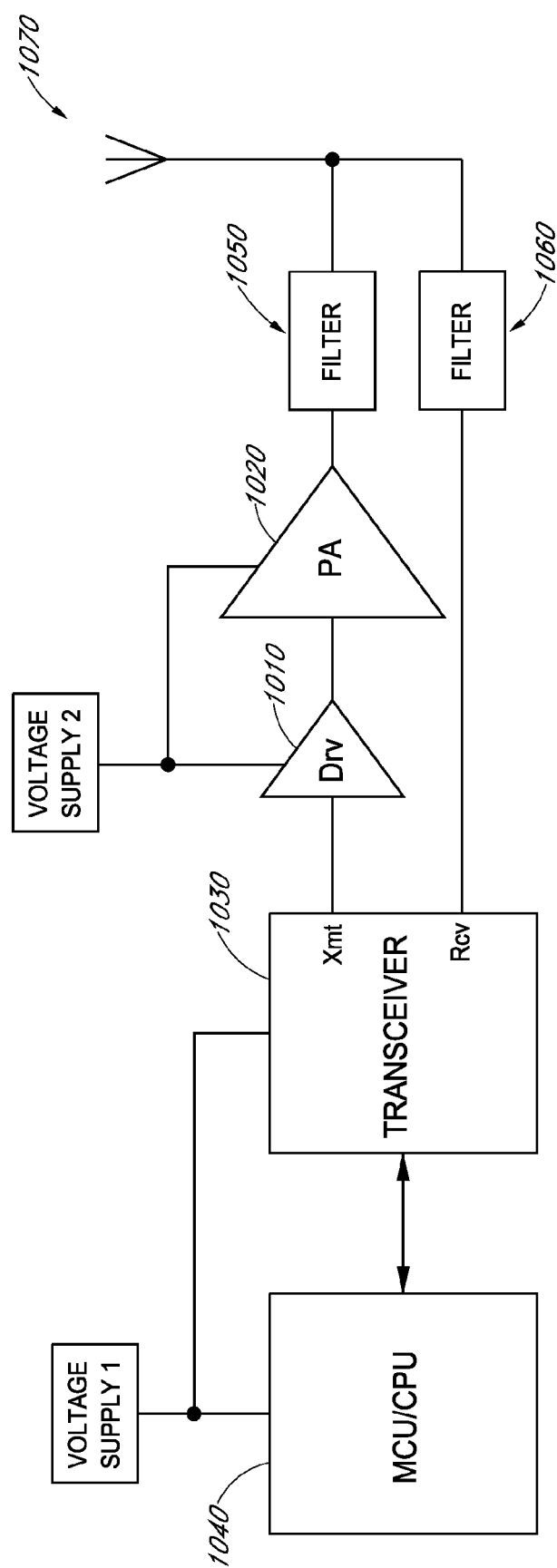
FIGS. 10 and 11 illustrate block diagrams of embodiments of communication systems.

Turning now to FIG. 10, illustrated is a block diagram of an embodiment of a communication system. The communication system includes a transmitter driver ("Drv") 1010 and a transmitter power amplifier ("PA") 1020 that operate in a linear mode. A transmitter output Xmt of a transceiver 1030 produces a bandpass modulated signal. The communication system includes two separate voltage supply rails, one supplied by a voltage supply 1, and one supplied by a voltage supply 2. The voltage supply 1 powers low-voltage circuitry and the voltage supply 2 powers high-voltage circuitry.

A microprocessor control unit/central processing unit ("MCU/CPU") 1040 provides signal processing for the transceiver 1030. The transceiver 1030 produces a transmit signal that is coupled to the driver 1010, that in turn is coupled to the power amplifier 1020. An output of power amplifier 1020 is filtered by a transmit (bandpass) filter 1050 that in turn is coupled to an antenna 1070 for wireless communication with intended receivers. A receive signal received by the antenna 1070 is filtered by a receive filter 1060 that is coupled to a receive input Rcv of the transceiver 1030. The MCU/CPU 1040 processes a received signal produced by the transceiver 1030. In an embodiment, the MCU/CPU 1040 comprises a field programmable gate array.

Figure 11:
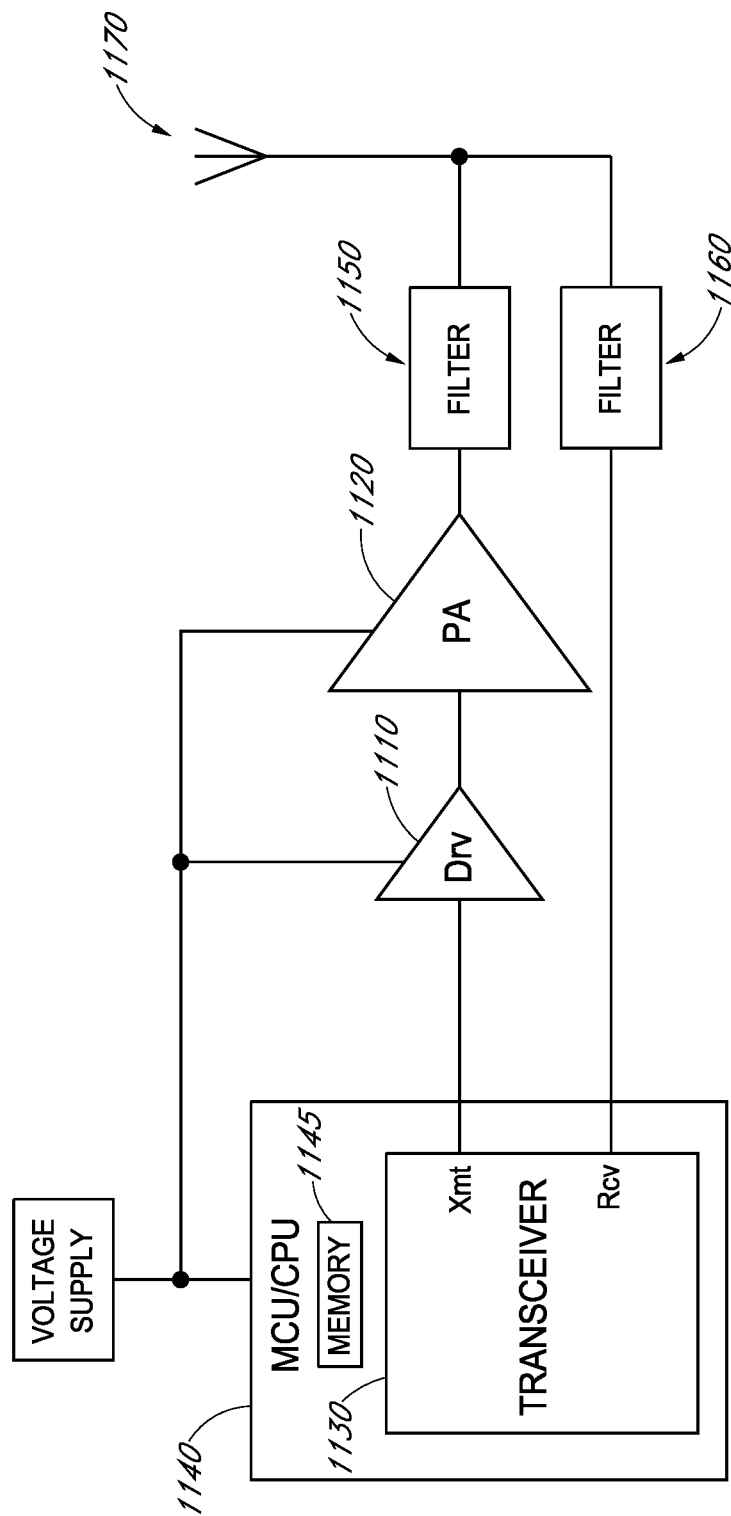

Turning now to FIG. 11, illustrated is a block diagram of an embodiment of a bandpass communication system. The communication system includes a transmitter driver ("Drv") 1110 and a transmitter power amplifier ("PA") 1120. A transmitter output Xmt of a transceiver 1130 produces a bandpass modulated signal within a limited range of frequencies. The communication system includes a voltage supply.

A MCU/CPU 1140 provides signal processing for the transceiver 1130 and may employ local memory 1145 or external memory (not shown). The MCU/CPU 1140 may be embodied as any type of processor and associated circuitry configured to perform one or more of the functions described herein. For example, the MCU/CPU 1140 may be embodied as or otherwise include a single or multi-core processor, an application specific integrated circuit, a collection of logic devices, or other circuits. The memory 1145 may be embodied as read-only memory devices and/or random access memory devices. For example, the memory 1145 may be embodied as or otherwise include dynamic random access memory devices ("DRAM"), synchronous dynamic random access memory devices ("SDRAM"), double-data rate dynamic random access memory devices ("DDR SDRAM"), and/or other volatile or non-volatile memory devices. The memory 1145 may have stored therein programs including a plurality of instructions or computer program code for execution by the MCU/CPU 1140 to control particular functions for the transceiver 1130.

The transceiver 1130 produces a transmit signal that is coupled to the driver 1110, that in turn is coupled to the power amplifier 1120. An output of power amplifier 1120 is filtered by a transmit (bandpass) filter 1150 that in turn is coupled to an antenna 1170 for wireless communication with intended receivers. A receive signal received by the antenna 1170 is filtered by a receive filter 1160 that is coupled to a receiver input Rcv of the transceiver 1130. The MCU/CPU 1140 processes a received signal produced by the transceiver 1130.

As illustrated, the transceiver 1130 is absorbed into the MCU/CPU 1140. The driver 1110 and power amplifier 1120 are now of switch-mode type, and the single low-voltage supply is employed. The use of a switch-mode driver 1110 and power amplifier 1120 allows the transceiver transmit output Xmt be a two-level signal within which the desired bandpass signal has been encoded. The design of switch-mode drivers and power amplifiers is well known in the art and will not be described further herein in the interest of brevity.

There are different processes that can be utilized to encode the information-bearing bandpass signal into a two-level signal suitable for transmission via a switch-mode power amplifier. One such encoding process employs a discrete-time delta-sigma modulator to convert a modulated signal into a discrete-time two-level (binary) signal. The binary signal is then converted to the analog domain using, for example, a zero-order hold circuit.

Figure 12:
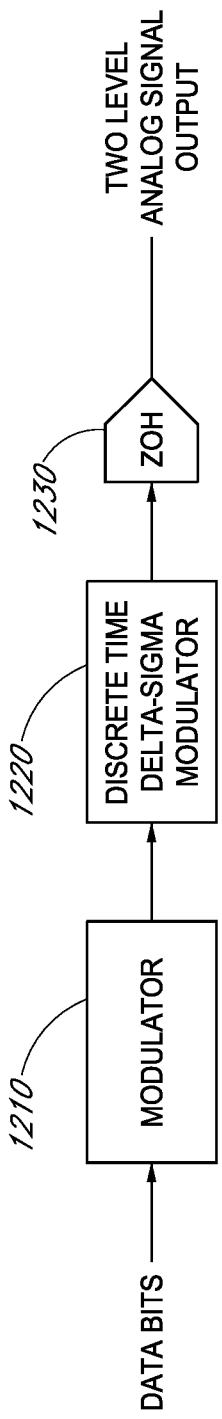
FIG. 12 illustrates a block diagram of an embodiment of a portion of a transmit path of a transceiver.

Turning now to FIG. 12, illustrated is a block diagram of an embodiment of a portion of a transmit path of a transceiver. In the transmit path, data bits to be transmitted to a receiver are input to a modulator 1210, an output of which is coupled to an input of a discrete-time delta-sigma modulator ("DTDSM") 1220. The output of the DTDSM 1220 is coupled to a zero-order hold ("ZOH") circuit 1230. The ZOH circuit 1230 converts its input signal to a continuous-time signal by holding constant each discrete-time value of the input signal between sample intervals. The output of the ZOH circuit 1230 is thus a signal in the form of a discontinuous sequence of constant signal amplitudes. In an embodiment, the output of the ZOH circuit 1230 assumes two analog values suitable for driving a switch-mode power amplifier. By the DTDSM 1220 varying the time length of the sample intervals, the switch-mode power amplifier coupled to the ZOH circuit 1130 through a driver is enabled to produce an amplified waveform that alternates between the two amplitude values. The output of the switch-mode power amplifier is then filtered before transmission to produce a desired, modulated transmission signal with limited bandwidth.

Figure 13:
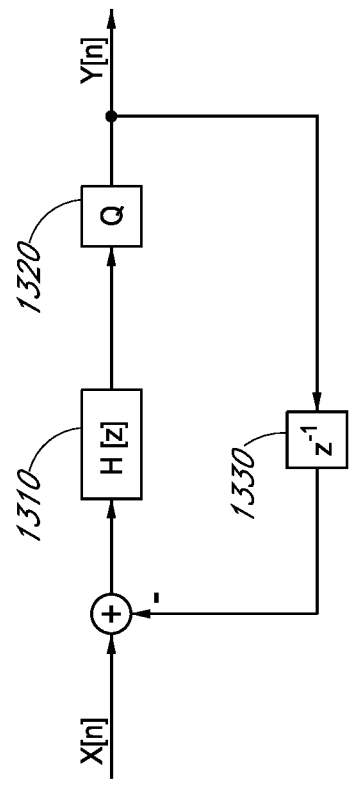
FIG. 13 illustrates a block diagram of an embodiment of a discrete-time delta-sigma modulator.

Turning now to FIG. 13, illustrated is a block diagram of an embodiment of a DTDSM. The DTDSM forms a feedback system wherein an input signal X[n] is fed to the DTDSM and an output signal Y[n] is provided therefrom. The DTDSM includes a loop filter 1310 with a Z-transform H[z], a quantizer 1320 (having a quantization variable "Q"), and a feedback signal (shown with a single delay element 1330 with Z-transform $z^{-1}$) that is subtracted from the input signal X[n] to form the input to the loop filter 1310.

At a base level, a sampling rate for the DTDSM is chosen with the Z-transform H[z] of the loop filter 1310 and the number of levels of quantization to generate the desired characteristics of the output signal Y[n]. First, in the case where two-level encoding is desired, which is generally the case for a switch-mode power amplifier, the quantizer 1320 is chosen to have two levels. Next, the sample rate and loop filter characteristics are chosen to produce the desired quantization noise shaping (to meet the desired transmit signal-to-noise ratio ("SNR"), as well as the in-band and out-of-band frequency spectrum characteristics). The magnitude of the SNR and quantization noise shape are closely linked to the selected loop filter order and over-sampling ratio ("OSR"). For a low-pass DTDSM, the OSR is defined as the ratio between the sampling rate of the DTDSM and the low-pass bandwidth of the DTDSM (passband bandwidth). In general, for a given SNR, the higher the OSR, the wider the low-pass bandwidth. The block diagram illustrated in FIG. 13 shows a single feedback loop. It is contemplated that more complex feedback arrangements can be employed to construct a DTDSM.

In operation, the transmitter takes the information data bits (or symbols/constellation elements) to be transmitted as an input, and generates the desired passband signal using a modulator. Then the passband signal is encoded into a two-level discrete signal with the DTDSM. Finally, a two-level signal suitable for input to a switch-mode power amplifier is produced by way of the zero-order hold circuit. As described previously hereinabove, the modulator, DTDSM and zero-order hold circuit are all active when the passband signal is being transmitted and necessarily consuming computational resources (and electrical energy). To achieve high SNR levels and a wide DTDSM passband, the DTDSM may be executed at a high rate. As introduced herein, when transmitting a signal, the computational resources by the modulator and DTDSM can be significantly reduced by pre-coding DTDSM output binary patterns in response to the information symbols that are to be transmitted. The case of a passband communication system employing binary frequency-shift keying ("BFSK") is illustrated below.

Figure 14:
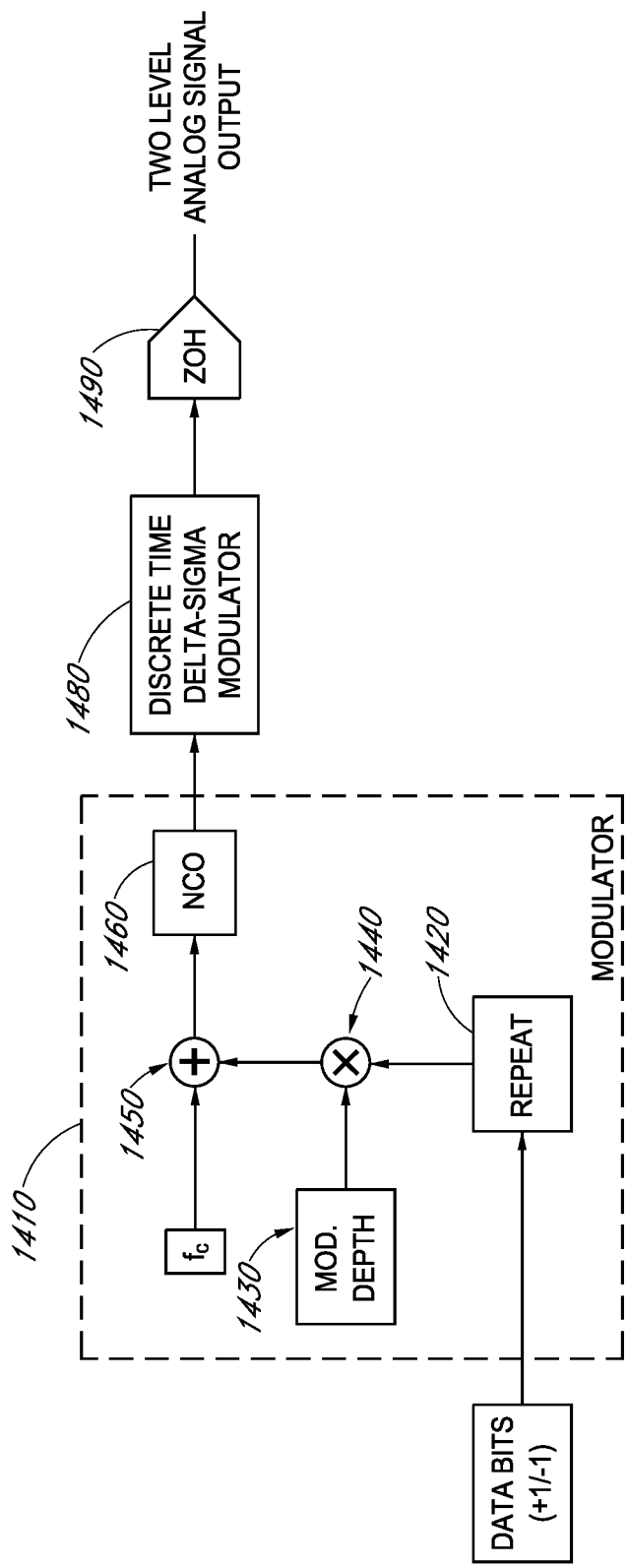
FIGS. 14 and 15 illustrate block diagrams of embodiments of a portion of a transmit path of a transceiver.

Turning now to FIG. 14, illustrated is a block diagram of an embodiment of a portion of a transmit path of a transceiver. In the transmit path, data bits (an input data stream) to be transmitted to a receiver are input to a binary frequency-shift keying ("BFSK") modulator 1410, an output of which is coupled to an input of a discrete-time delta-sigma modulator ("DTDSM") 1480. The output of the DTDSM 1480 is coupled to a zero-order hold ("ZOH") circuit 1490. The ZOH circuit 1490 converts its input signal to a continuous-time signal by holding constant each discrete-time value of the input signal between sample intervals. The output of the ZOH circuit 1490 is thus a signal in the form of a discontinuous sequence of constant signal amplitudes. In an embodiment, the output of the ZOH circuit 1490 assumes two analog values suitable for driving a switch-mode power amplifier.

With respect to the modulator 1410, the data bits are fed serially to a repeat circuit 1420 that bridges the sampling rate difference between the information signal (the data bits) and both the modulator 1410 and the DTDSM 1480. In this case, it is assumed that the modulator 1410 and the DTDSM 1480 are running at the same sampling rate and do not require further sampling rate matching. It is possible for the modulator 1410 to be run at a lower (or higher) rate than the DTDSM 1480 with the inclusion of interpolation (or decimation) therebetween. Following the repeat circuit 1420, each data bit (±1) is multiplied by a constant set in modulation depth circuit 1430 via a multiplier 1440 to set the modulation depth and added in adder 1450 to the carrier frequency $f_c$ to drive a numerically controlled oscillator ("NCO") 1460 to produce the desired frequency-shift keying ("FSK") modulated signal that is coupled to the input of the DTDSM 1480. The modulated signal output is then encoded by the DTDSM 1480 and passed to a zero-order hold circuit 1490 for conversion into the analog domain to form the input signal to a driver for the switch-mode power amplifier.

Figure 15:
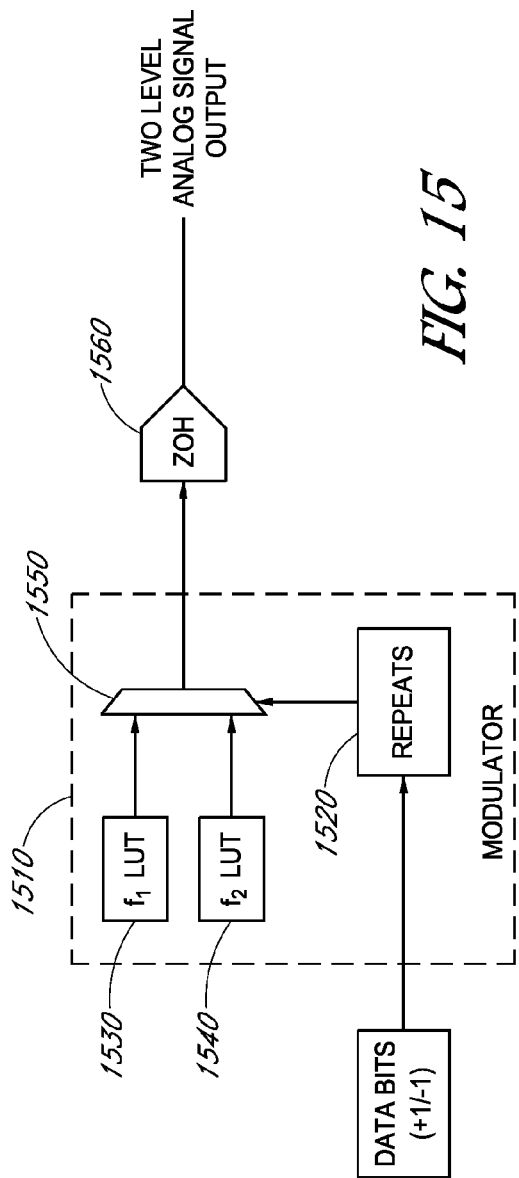

Turning now to FIG. 15, illustrated is a block diagram of an embodiment of a portion of a transmit path of a transceiver. In the transmit path, data bits (an input data stream) to be transmitted to a receiver are input to a binary frequency-shift keying ("BFSK") modulator 1510, an output of which is coupled to a zero-order hold ("ZOH") circuit 1560. The ZOH circuit 1560 converts its input signal to a continuous-time signal by holding constant each discrete-time value of the input signal between sample intervals. The output of the ZOH circuit 1560 is thus a signal in the form of a discontinuous sequence of constant signal amplitudes. In an embodiment, the output of the ZOH circuit 1560 assumes two analog values suitable for driving a switch-mode power amplifier.

The data bits (or symbols/constellation elements representing information data) are fed to a repeat circuit 1520 of the modulator 1510. First and second look-up tables ("LUTs") 1530, 1540 (e.g., incorporated in memory) provide entries selected by a selector 1550 that is controlled by the output of the repeat circuit 1520. An output of the selector 1550 is coupled to the input of a zero-order hold circuit 1560 for conversion into the analog domain to form the input signal to a driver for the switch-mode power amplifier. Thus, as introduced herein, the predictable output of a DTDSM that would otherwise be produced in real time with substantial computation is precomputed and merely selected in accordance with the data bits.

The transmitter or transceiver as described herein runs at a high rate with a higher level of computational efficiency. The transmitter simply selects from one of multiple (e.g., two) precomputed bit patterns that are stored, without limitation, in look-up tables ("LUTs"). The depth of each LUT is equal to the length of the data symbols being transmitted. Such a transmitter lends itself to implementation using direct memory access ("DMA") functionality found in many MCU/CPUs, thereby further offloading computational burden from the core of the MCU/CPU. Using this scheme and precomputing the entries for the LUTs allows use of a less complex MCU/CPU to compute the DTDSM output quickly and achieve similar performance results.

The content of the LUTs could be computed and stored in the tables of memory immediately following initialization of the MCU/CPU at power-on-reset ("POR"), and may not need to be recomputed while the MCU/CPU remains powered. If the relative signal level of the encoded passband signal needs to be adjusted, it is still possible to do so by re-computing the LUTs when, for instance, the device is not transmitting a signal. Alternatively, the content of the LUTs could be computed completely external to the MCU/CPU and be stored in non-volatile memory to which the MCU/CPU has access.

Figure 16:
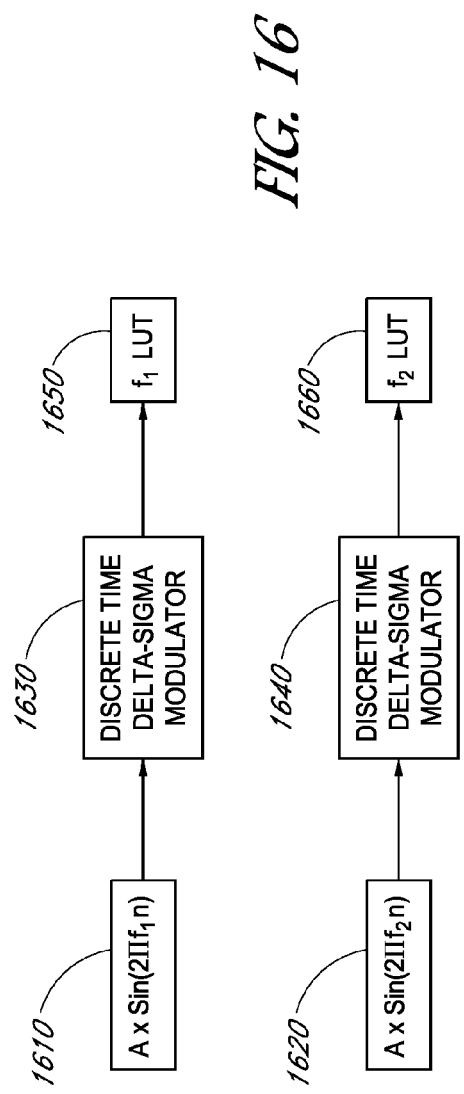
FIG. 16 illustrates block diagrams of embodiments of computing entries for look-up tables associated with a modulator.

Turning now to FIG. 16, illustrated are block diagrams of embodiments of computing entries for look-up tables associated with a binary frequency-shift keying ("BFSK") modulator. The two alternative input frequencies are produced by sine wave generators 1610, 1620 associated with an output of the BFSK modulator are known to be $f_1$ and $f_2$. Given a desired amplitude A of the encoded signal, each frequency is used to generate and encode a sinusoidal signal of the appropriate frequency and amplitude for a duration equal to one bit period using first and second DTDSMs 1630, 1640, and storing the results as entries in first and second LUTs 1650, 1660. Thus, a two-level signal to drive a switch-mode power amplifier is produced having characteristics akin to the output of a DTDSM generated in a computationally efficient manner.

The need for volatile and/or non-volatile memory to store the LUT data is recognized. In addition, the need to re-compute the LUTs if the amplitude of the transmitted bandpass signal is to be changed implies that the transmitted signal amplitude may not be changed, for instance, within the MCU/CPU while a signal is being transmitted. Instead, one can wait until the device is no longer transmitting a signal to re-compute the entries for the LUTs with a signal encoded at the desired level.

A volatile and/or non-volatile memory may be used to store the LUT data. In addition, the need to recompute the LUTs if the amplitude of the transmitted bandpass signal is to be changed may be employed as the application dictates. The degree to which the output spectrum deviates from that produced by a real time system depends upon a number of factors, primarily the depth of the LUTs. Thus, in general, better spectral performance is achieved by using deeper LUTs, which may employ more memory (volatile or non-volatile). Thus, the system generates a two level signal having characteristics that are akin to the output of a DTDSM in a computationally efficient manner. To improve the resulting noise-like frequency spectrum, a plurality of LUT entries corresponding to each data bit value can be stored and selected randomly or in some predetermined order.

The system is applicable to devices that contain communications capability with a computationally efficient transmitter, especially given the tremendous cost pressure on consumer devices. An alternative solution in the case of a frequency shift keying ("FSK") passband communication system is to drive the switch-mode driver and power amplifier with a two level signal that is a 'squared up' version of the sinusoidal modulated signal. The harmonic content at the output of the power amplifier may be degraded, thus employing additional filtering to meet the same spectral performance. The amplitude of the modulated signal may be more difficult to control, as some type of circuit to alter the supply voltage to the power amplifier in response to the desired signal amplitude is needed.

Figure 17:
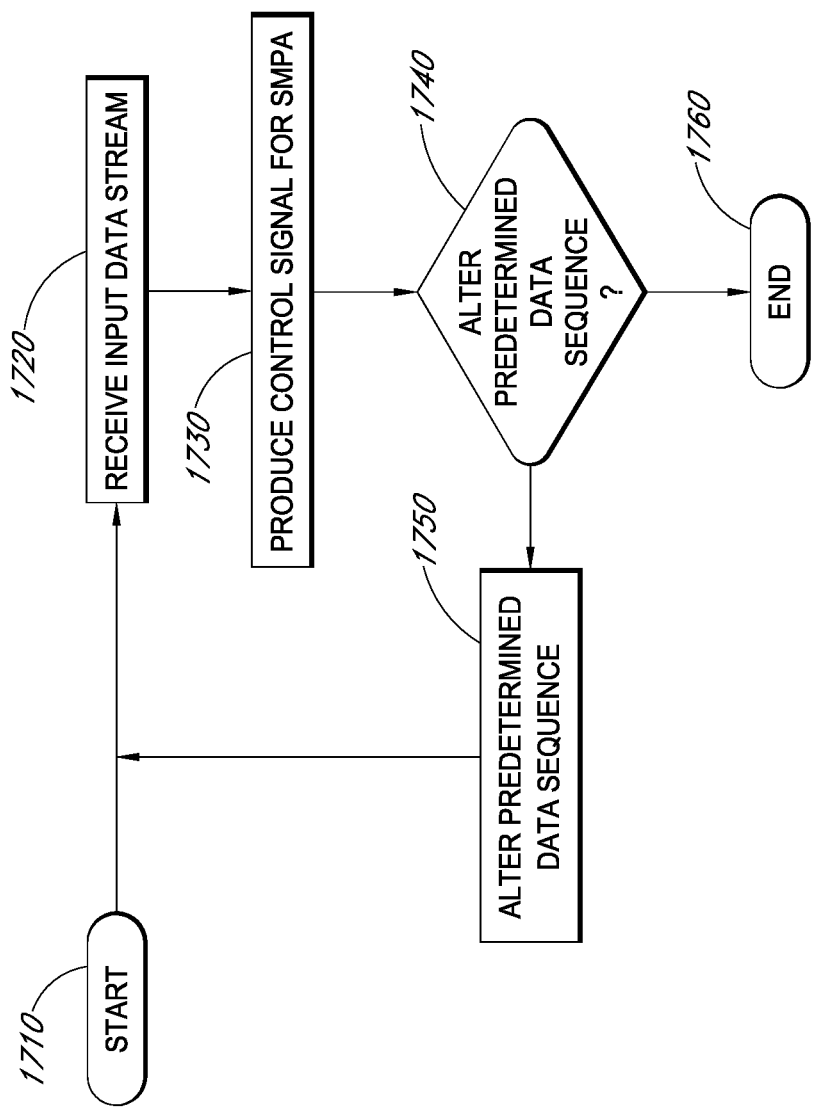
FIG. 17 illustrates a flow diagram of an embodiment of a method of operating a communication system.

Turning now to FIG. 17, illustrated is a flow diagram of an embodiment of a method of operating a communication system. The communication system includes a transmitter or transceiver, a switch-mode driver, a switch-mode power amplifier ("SMPA") and a bandpass filter (coupled to the output of the switch-mode power amplifier). The communication system also includes an apparatus having a processor and memory embodied in, for instance, the transmitter or transceiver for preforming the method as set forth herein. The switch-mode power amplifier and the apparatus are powered by a common voltage source, and the driver is coupled between the apparatus and an input of the switch-mode power amplifier.

The method begins at a start step or module 1710. At a step or module 1720, the apparatus receives an input data stream. The method also includes producing a control signal for the switch-mode power amplifier employing a predetermined data sequence selected by the input data stream at a start step or module 1730. The predetermined data sequence may be stored in a lookup table of the memory accessible by the processor, and precomputed employing a discrete-time delta-sigma modulator. A plurality of entries may be stored in the lookup table corresponding to values of the input data stream. An entry stored in the lookup table may be selected randomly from a set of entries in response to the input data stream to produce the control signal for the switch-mode power amplifier. The control signal for the switch-mode power amplifier may produce a binary frequency-shift keyed output for the switch-mode power amplifier.

In a decisional step or module 1740, it is determined if the predetermined data sequence should be altered. If the predetermined data sequence should be altered, then the apparatus alters the predetermined data sequence based on input data streams in a step or module 1750 and the method returns to the step or module 1720. For instance, the predetermined data sequence may be altered for an altered amplitude of an output of the switch-mode power amplifier. If the predetermined data sequence does not need to be altered, the method ends at a step or module 1760.

For a better understanding of delta-sigma modulators, see "Delta-Sigma Data Converters," by Norsworthy, Schreier, and Temes, John Wiley and Sons, Hoboken, N.J. (1997). The aforementioned reference is incorporated herein by reference in its entirety.

There is a plurality of advantages of the present disclosure arising from the various features of the apparatuses, circuits, and methods described herein. It will be noted that alternative embodiments of the apparatuses, circuits, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present invention as defined by the appended claims.

Program or code segments making up the various embodiments may be stored in a computer readable medium or transmitted by a computer data signal embodied in a carrier wave, or a signal modulated by a carrier, over a transmission medium. For instance, a computer program product including a program code stored in a computer readable medium (e.g., a non-transitory computer readable medium) may form various embodiments. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network communication channels, optical fibers, air, electromagnetic links, RF links, and the like. The code segments may be downloaded via computer networks such as the Internet, Intranet, and the like.

Also, although the present invention and its advantages have been described in detail, it should be understood that various changes, substitutions, and alterations can be made herein without departing from the spirit and scope of the invention as defined by claims on embodiments. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, claims on embodiments are intended to include within their scope such processes, machines, manufacture, compositions of matter, means, methods, or steps.

What is claimed is:

1. A communication system, comprising:
    a transmit filter including a transmit filter capacitor;
    a receive filter coupled to said transmit filter; and
    a switch, coupled to an auxiliary winding of a transformer and to said transmit filter capacitor, configured to be open to alter an impedance of said transmit filter during a receive mode of operation of said communication system.

2. The communication system as recited in claim 1, wherein said receive filter is coupled to said transmit filter at a common circuit node.

3. The communication system as recited in claim 1, wherein said switch is coupled in parallel with said auxiliary winding of said transformer.

4. The communication system as recited in claim 1, further comprising a transceiver configured to provide a signal to control said switch.

5. The communication system as recited in claim 1, wherein said communication system is coupled to an alternating current power line.

6. The communication system as recited in claim 1, wherein said switch is formed with a pair of back-to-back metal-oxide semiconductor field-effect transistors.

7. The communication system as recited in claim 1, wherein said transformer is configured to galvanically isolate a power amplifier from a communication medium.

8. The communication system as recited in claim 7, wherein said transmit filter comprises a transmit filter inductor coupled between an output of said power amplifier and a primary winding of said transformer.

9. The communication system as recited in claim 1, wherein said auxiliary winding of said transformer is a secondary winding and said transmit filter capacitor is coupled thereto.

10. A method of operating a communication system, comprising:
    filtering a signal to be transmitted with a transmit filter including a transmit filter capacitor during a transmit mode of operation of said communication system;
    filtering a receive signal with a receive filter coupled to said transmit filter during a receive mode of operation of said communication system; and
    altering an impedance of said transmit filter by opening a switch coupled to an auxiliary winding of a transformer and to said transmit filter capacitor during said receive mode of operation.

11. The method as recited in claim 10, wherein said receive filter is coupled to said transmit filter at a common circuit node.

12. The method as recited in claim 10, wherein said switch is coupled in parallel with said auxiliary winding of said transformer.

13. The method as recited in claim 10, wherein altering said impedance of said transmit filter comprises providing a signal from a transceiver to control said switch.

14. The method as recited in claim 10, wherein said communication system is coupled to an alternating current power line.

15. The method as recited in claim 10, wherein said switch is formed with a pair of back-to-back metal-oxide semiconductor field-effect transistors.

16. The method as recited in claim 10, wherein said transformer is configured to galvanically isolate a power amplifier from a communication medium.

17. The method as recited in claim 16, wherein said transmit filter comprises a transmit filter inductor coupled between an output of said power amplifier and a primary winding of said transformer.

18. The method as recited in claim 10, wherein said auxiliary winding of said transformer is a secondary winding and said transmit filter capacitor is coupled thereto.

\* \* \* \* \*